May 23, 1967      G. R. CHRISTENSEN      3,320,942
BARBECUE GRILL
Filed May 18, 1965
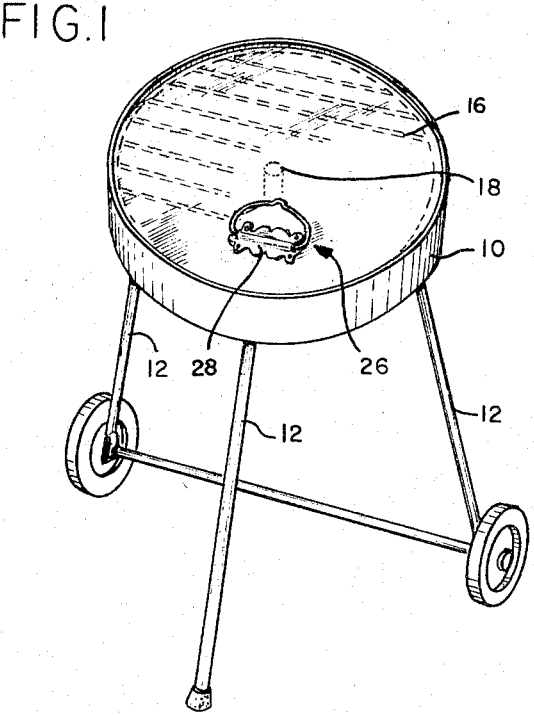
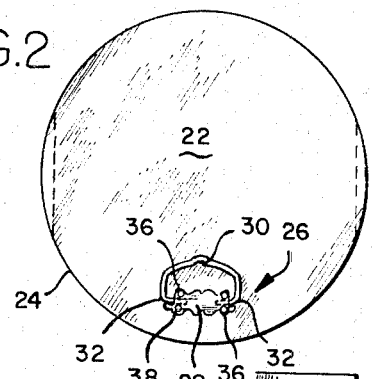
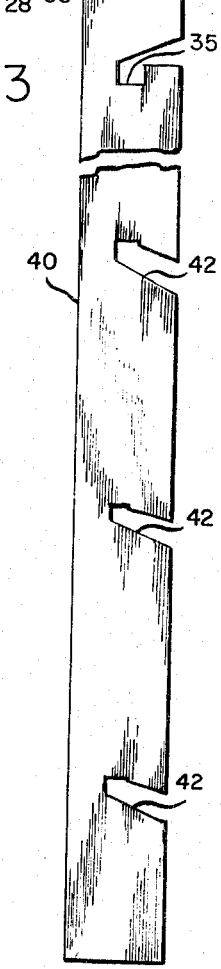
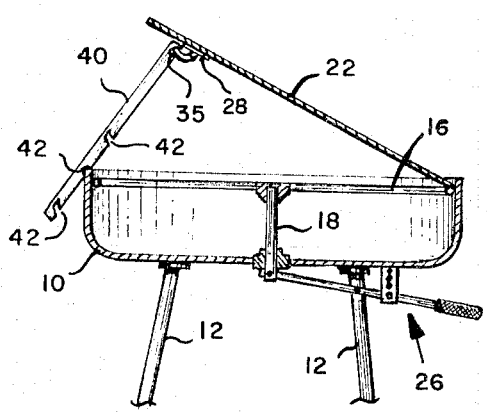
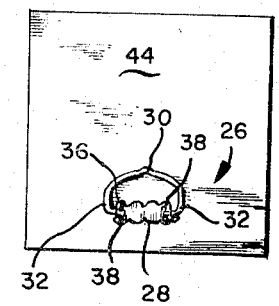
INVENTOR.
GORDON R. CHRISTENSEN
BY RONALD E. BARRY
Attorney

United States Patent Office 3,320,942
Patented May 23, 1967

3,320,942
BARBECUE GRILL
Gordon R. Christensen, 6014 N. Kent,
Milwaukee, Wis. 53217
Filed May 18, 1965, Ser. No. 456,796
1 Claim. (Cl. 126—25)

This invention relates to barbecue grills either of the indoor or outdoor type and more specifically to auxiliary equipment useable with such devices. This application is a continuation-in-part application of my United States application Ser. No. 345,803, filed Feb. 18, 1964, now abandoned.

Barbecueing food by using charcoal burners requires a new supply of charcoal each time a barbecue is started. It is well known that the new charcoal is slow starting and will produce heat sufficient to actually cook food for a considerable period of time although only a relatively short time is needed to cook the food. This means that there is a considerable amount of time lost in start up as well as a considerable waste of charcoal. Barbecue grills if left unattended are also a fire hazard because of wind as well as being a hazard to children.

The principal object of the present invention is to provide an accessory for such barbecue grills which will overcome the above hazards.

Another object of the present invention is to provide a cover or lid for such grills that can be simply and easily inserted into the grill to cut off the air to the combustible material.

Another object of this invention is to provide a cover or lid for these grills which makes it possible to re-use the unburned charcoal in the grill.

Still another object of the present invention is to provide a cover or lid for a grill which will reduce the amount of air to the charcoal and at the same time will provide a heating surface for maintaining the temperature of the prepared foods.

A further object of the present invention is to provide an auxiliary device for increasing the intensity of heat on the grilling surface.

A still further object of the present invention is to provide an auxiliary device that eliminates the hazard of high winds and the danger to children of an unattended barbecue grill.

Other objects and advantages will become more readily apparent from the following detailed description when read in conjunction with the accompanying drawings, in which:

FIG. 1 is a perspective view of a barbecue grill with the auxiliary cover in position.

FIG. 2 is a top view of the cover or lid.

FIG. 3 is an enlarged view of the handle support.

FIG. 4 is a side view of the grill with a part of the sides removed.

FIG. 5 is a top view of a modified cover or lid.

Referring to FIG. 1 of the drawing, the barbecue grill includes a dish-type charcoal burner 10 supported on three legs 12. A hood can be mounted on the burner but is not necessary for the purposes of this invention. A grill 16 is supported on a center post 18 which projects through the center of the burner and is supported on an adjustable handle assembly 20 to raise or lower the grill. A cover or lid 22 can be placed on top of the grill and will snuff out the charcoal if the grill is in the lowest position or it can be used as a skillet if the grill is raised to the highest position.

The cover or lid 22 shown has a generally circular outer periphery 24 which is of a diameter substantially equal to the inside diameter of the barbecue burner so that it will fit within the burner. If a hood is used on the grill then two straight parallel edges (shown dotted in FIG. 2) must be provided on the sides of the cover to clear the inside of the edges of the hood. A handle assembly 26 is located in close proximity to one edge of the cover and includes a mounting plate 28 and U-shaped handle 30 having inwardly extending mounting bars 32. The handle may be secured to the mounting plate either before or after the mounting plate is secured to the cover or lid. In the drawing (FIG. 2) the mounting plate is shown having a number of holes 36. It is secured to the cover by passing metal screws 38 through the holes but any other securing means, such as rivets, could also be used.

The cover can be placed on the grill and if the grill is lowered to its lowest point, it will cut off the air of oxygen to the charcoal. If the grill is removed, the cover can be placed in the burner on top of the charcoal and it will also snuff out the charcoal. When the grill is raised to its upper position, the cover can be placed on the grill and used as a cooking plate. This makes it possible to cook eggs, pancakes, and the like outdoors.

The cover must have sufficient rigidity to withstand normal handling. A stainless-type aluminum has been found to be the best material for this use, having a gauge of at least .032 inch or more. This material is commonly known as 6061-T6 grade aluminum containing the following percentages by weight of the indicated material: 0.25% copper; 0.60% silicon; 1.00% magnesium; 0.25% chromium, and the remainder aluminum.

It is often desirable to heat meat products on both the top and bottom while barbecueing. If the cover is raised to an angular relation with respect to the grill, the surface of the cover will reflect the radiant heat from the charcoal downward on the grill. A support bar 40 (FIG. 3) is used to accomplish this.

In FIG. 4, the cover or lid is shown elevated at one side to an angular position with respect to the grill. Bar 40 can be secured to the handle assembly by inserting the center of handle 30 into notch 35 in the bar. It can then be pivoted to a collapsed or inoperative position, lying flat against the surface of the cover or raised to an extended or operative position, as shown in FIG. 4. A number of notches 42 are provided in the bar which are engageable with the edge of the burner when the cover is turned over to hold the cover in the angular position. Heat generated by the charcoal will then be radiated downward against the grill to increase the heat intensity at the grill surface to speed up the cooking operation.

In FIG. 5 a modified cover or lid 44 having a rectangular outer periphery is shown with its length and width being determined by the size of grill with which it is to be used. The handle assembly 26 is of the same type as shown and described above and is therefore numbered the same. It is located close to one of the longitudinal edges of the cover to provide easy access when moving the cover and also has an extension bar which is used to hold the cover in an elevated position. It should be noted that the handle assembly can also be used for hanging the cover on a wall when not in use.

In use, the cover is lifted by the handle and placed in the burner or on the grill if it is low enough. Since the outer dimensions are substantially the same as the inner diameter of the burner, the cover will cut off the air to the charcoal and extinguish the fire. If the grill is raised and the cover placed on it, it can be used as a surface for cooking food or for maintaining the temperature of prepared food.

Although only a few embodiments of the present invention have been shown and described, it should be apparent that various changes and modifications can be made herein without departing from the scope of the appended claim.

What is claimed is:

The combination of a barbecue grill having a dish-like fire pan of a predetermined outer circumference and an auxiliary device for cooking food, snuffing charcoal or reflecting heat, comprising a heat conductive metallic plate having an outer periphery slightly smaller and substantially conforming to the inner circumference of the fire pan, handle means on one surface of said plate in close proximity to the edge of the plate, and an extension bar pivotally connected to the handle means, said extension bar having a number of notches positioned for selective engagement with said grill, whereby said plate can be selectively placed on the fire pan to cut off air flow to the charcoal, on the grill for cooking or raised at an angle to said grill to reflect radiant heat onto the grill.

References Cited by the Examiner
UNITED STATES PATENTS

| | | | |
|---|---|---|---|
| 1,355,249 | 10/1920 | Nottingham | 126—256 |
| 2,520,578 | 8/1950 | Treloar | 126—25 |
| 3,021,830 | 2/1962 | Witcher | 126—25 |
| 3,025,848 | 3/1962 | Malgesini | 126—25 |
| 3,139,880 | 7/1964 | Sangeorge | 126—25 |

FREDERICK L. MATTESON, Jr., *Primary Examiner.*

E. G. FAVORS, *Assistant Examiner.*